March 24, 1942. J. C. CHENETTE 2,277,302
PORTABLE HAND TRUCK
Filed Aug. 3, 1940 2 Sheets-Sheet 2

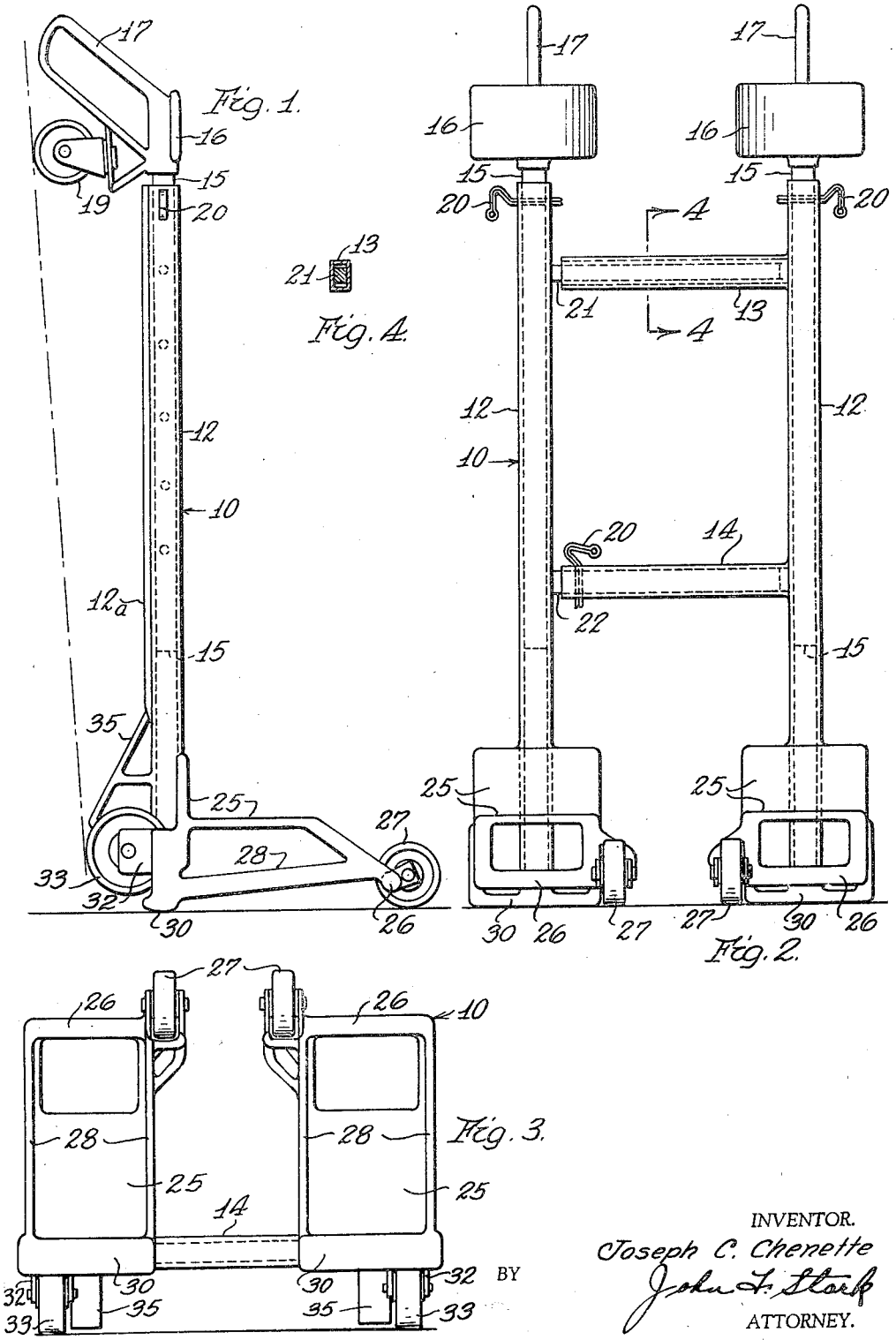

INVENTOR.
Joseph C. Chenette
BY John L. Stark
ATTORNEY.

Patented Mar. 24, 1942

2,277,302

UNITED STATES PATENT OFFICE 2,277,302

PORTABLE HAND TRUCK

Joseph C. Chenette, Flat Rock, Mich.

Application August 3, 1940, Serial No. 350,694

8 Claims. (Cl. 280—34)

This invention relates to portable trucks in general, and more particularly, concerns a hand truck having a rubber sheathed frame which is extensible longitudinally and/or laterally for reception of various shape articles.

When using the conventional hand truck difficulty has been experienced in its adaptation to accommodate articles of various shapes such as refrigerators, stoves, and water heaters. If the truck was long enough to properly handle a refrigerator it was too long and narrow to conveniently receive the new broad flat cabinet type stoves, and generally totally unsuited for a cylindrical water heater. Furthermore, the transportation of such home appliances as above described necessitates care that the highly finished surfaces thereof are not marred in handling, and which has heretofore been guarded against by blanketing the article, but this is a tedious time wasting expedient and is overcome in the present instance by an envelope coating or rubber sheathed frame members which contact the article supported thereby. Accordingly, to this end, the present invention overcomes the aforementioned difficulties by providing a portable hand truck having rubber sheathed, load supporting, frame members which are extensible longitudinally and/or laterally.

Among the objects of the present invention is the provision of a portable hand truck having a frame comprising telescoping side members having caster wheels upon their lower ends and hand holds upon their upper ends, and including one or more telescoping cross members for lateral or width adjustment; the provision in a hand truck, as above described, of spaced load supporting pads adjacent each end of the telescoping side members including a second set of swivelable caster wheels adjacent the upper hand holds thereof and a pair of oval padded brake members forward of the first set of caster wheels to prevent accidental displacement of the truck when at rest in a self-standing position; the provision in a hand truck, as above described, of a second set of hand holds formed integrally with the lower set of load supporting pads, including a third set of auxiliary caster wheels journalled thereon for rolling the truck under an article to be moved when in an upright position; the provision in a hand truck, as above described, of skids or runners on the back of the frame side members angled off from adjacent the main caster wheels to prevent any sudden drop, when shifted to or from an automotive truck or loading dock, from the hand truck wheels to the truck proper.

Another object of the invention is the provision of a portable hand truck having extensible frame members with hand holds upon their upper ends including rubber sheathed load supporting pads and cradle for reception of a cylindrical article including pivotal and adjustable hand grips and auxiliary caster wheels for movement of the truck in a horizontal or inclined position; the provision in a hand truck, as above described, in which said auxiliary caster wheels are journalled upon a shiftable axle arranged to be moved into load supporting position when the truck is tilted into a substantially vertical position.

Further and other objects and advantages of the invention reside in the novel combination and arrangement of parts to be hereinafter described in conjunction with the drawings forming a part of this specification and pointed out with particularity in the appended claims.

In the drawings like reference characters denote corresponding parts throughout the several views, and in which:

Fig. 1 is a side elevational view of a preferred form of hand truck according to this invention; and Fig. 2 is a front elevational view of the hand truck in a vertical position; and Fig. 3 is a bottom plan view of the truck shown in Fig. 1; and Fig. 4 is a sectional view of a transverse telescoping frame member taken on the line 4—4 of Fig. 2.

Figure 5:
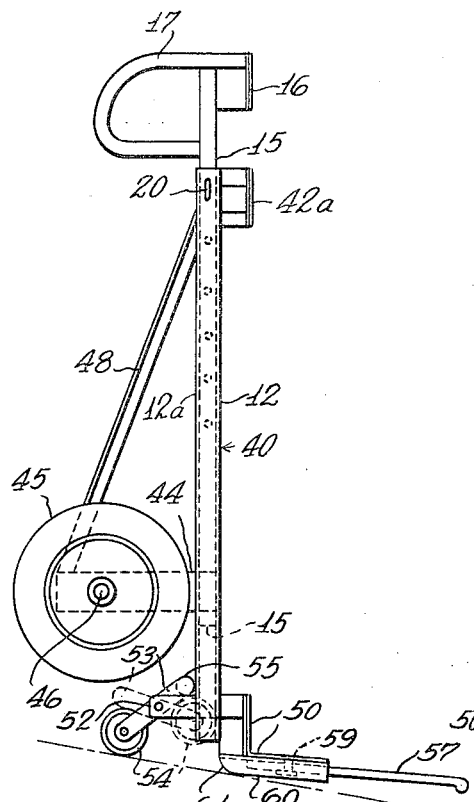
Fig. 5 is a side elevational view of a modified form of extensible hand truck.

Now having reference to the drawings, and particularly Figs. 1 through 4, there is shown a portable hand truck, generally designated 10, having a pair of opposite side frame members 12—12, and upper and lower cross frame members 13 and 14, respectively. The side frame members 12—12 are of hollow rectangular section into the upper ends of which are telescoped extensible frame members 15 having transverse bearing pads 16 adjacent their outer ends and terminating in a pair of elongated looped hand holds 17 integral therewith and depending therefrom. In some instances it may be desirable to provide a pair of auxiliary swivelable caster wheels 19 which may be suspended from the rear face of the bearing pads and inward of the hand holds but having the lower peripheries of the caster wheels extending below the marginal edge of the hand holds thereby enabling the truck to be used as a rolling dollie. The telescoping frame members 15—15 have a series of spaced openings therethrough for reception of a split spring pin 20 which securely maintains the truck in the selected adjusted length regardless of the position in which the truck is tilted.

The cross frame members 13 and 14 likewise have telescoping sections 21 and 22, respectively, and the member 14 has a split spring pin for holding the telescoped section 22 in adjusted position. However, the telescoped section 21, of the cross frame member 13, needs no split spring pin, and, as will be noticed from Fig. 4, its vertical dimension is substantially less than its width which is just sufficient to present a sliding fit to the hollow section of the frame member 13. The reason for this is that if the two telescoping sections 21 and 22 were just sufficient to present a flull sliding fit into their respective enveloping frame members it would require perfect alignment of the cross frame members where they are welded to the side frame members 12—12, in order to prevent binding when the truck is adjusted as to width or in a lateral direction. With the present construction, however, it will be apparent that the opposite frame members 12 are free to shift slightly in a longitudinal direction to compensate for mechanical inaccuracies by reason of the vertical clearance between the telescoped section 21 and its enveloping frame member 13, but the frame members are substantially prevented from twisting out of a plane passed through the longitudinal axis of the truck by reason of the close sliding fit between the telescoped frame members 13, 21 and 14, 22 in the opposite direction, thereby presenting a substantially flat surface throughout its adjustment range to an article to be carried thereby. It will be apparent now that under certain conditions it will not be necessary to provide the upper telescoping frame members 13 and 21, where a slight amount of twisting of the frame members 12—12 out of a flat plane passed therethrough is not objectionable, and, accordingly, the frame members 13 and 21 may be readily omitted without sacrificing any of the other advantageous features of this invention.

Adjacent the lower ends of the side frame members 12—12 a pair of right-angled load supporting or bearing members 25 are welded thereto, which are substantially coextensive in width with the pad members 16, but somewhat more elongated in their horizontal dimension. The forward ends of the bearing members 25 are bent at an angle to the horizontal plane of the bearing member proper and extended approximately to a horizontal plane through the lower marginal end of the side frame members where they terminate in integral hand holds 26. This set of hand holds may be used for conveniently carrying the lower end of the truck up stairways and when lifting the truck on and off automotive trucks or loading docks. Adjacent the inner edges of the hand holds 26 a pair of opposed small caster wheels 27 are rotatably suspended therefrom which support the hand truck 10 in a vertical self-standing position and are adapted for auxiliary rolling of the truck under an article to be carried or when it is necessary to pivot the truck in a vertical position as in going around a stairway landing or advancing the article into a wall recess. From the opposite sides of each of the hand holds 26 a pair of elongated brace members 28 welded thereto are extended to opposite ends of transverse shoe members 30 welded normally to the lower ends of the side frame members 12. These shoe members 30 have a half-oval rubberized bearing face which contacts the floor when the truck is in a vertical or self-standing position and act as a brake to prevent accidental displacement of the truck until it is tilted slightly forward for rolling movement upon the caster wheels 27 or tilted backward upon the oval brake pads or shoe members 30 as a fulcrum until the truck is supported for rolling movement by the main truck wheels, about to be described.

Intermediate the horizontal surface of the bearing members 25 and shoe members 30, U shaped members 32 are welded out-board to the sides of the frame members 12 and are adapted to rotatably journal a pair of main truck wheels 33 for rolling the truck 10 along a carriageway when grasped either by the hand holds 17 or when in a horizontal position and rolled upon the second set of caster wheels 19 and used as a four-wheeled dollie. The rear face 12a of the frame side members 12 are arranged to be used as skids or runners for the easy sliding on or off of automatic truck tailgates and loading docks; and to prevent any sudden drop from the truckwheels 33 to the truck proper, there is a braced triangular-shaped runner 35 welded to the rear face 12a of the lower portion of the frame side members 12 which extends inside of and almost to the lower periphery of the main truck wheels 33. It will thus be apparent there is only a matter of a fractional part of an inch difference in elevation or drop between the time when the load is carried by the truck wheels 33 and when it is passed to the angled runners 35 and gradually to the runners or skids on the rear faces 12a of the side frame members 12.

The use and operation of this apparatus is believed apparent from the detailed description hereinbefore enumerated but it is important to point out that after the truck is constructed all the outer parts thereof that may come in contact with a finished surface of an article to be carried, or the enclosing area or furniture near which the truck is moved, with the exception of the surface 12a of the frame members 12 and the runners 35, are bonded or have an envelope coating of rubber which may be applied to the metal by a well known process. Consequently the apparatus as viewed in the drawing is sheathed in a rubber coating. Since the truck is extensible both longitudinally and laterally it may be elongated to carry a tall upright refrigerator or widened to accommodate the new flat, broad cabinet-base stove. Furthermore, since the inner edges of the rubber-sheathed bearing pads 16 have a small inwardly extending radius, they are suited for safely cradling a round water heater or cooler.

Figure 6:
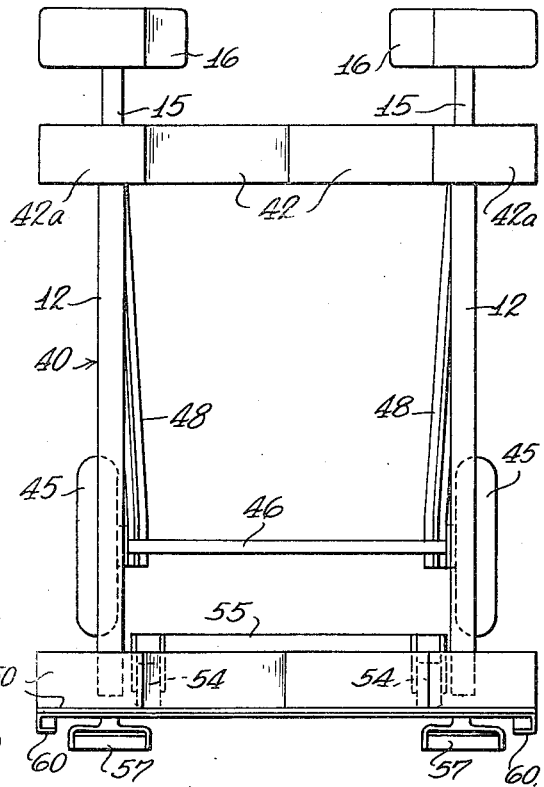
Fig. 6 is a front elevational view thereof.
Figure 7:
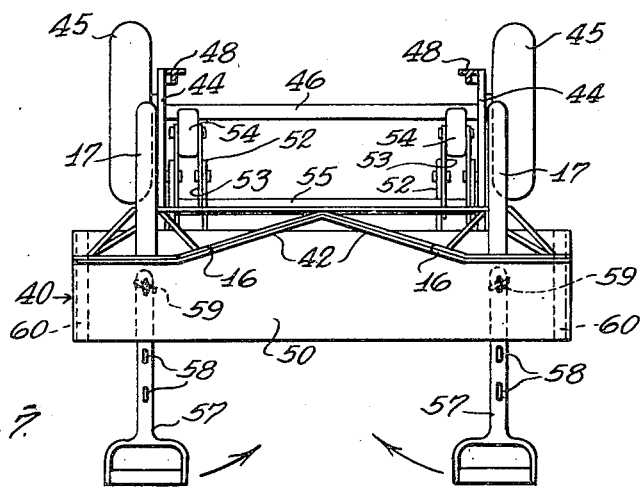
Fig. 7 is a top plan view of the truck in Fig. 5 with the brace members broken away and shown in section.

In the modification, shown in Figs. 5 to 7 inclusive, of the drawings there is illustrated a portable hand truck, generally designated 40, designed especially for cradling round articles and adapted for warehouse use as a truck. In this instance the truck 40 has frame members of rectangular hollow steel tubing as in the first enumerated truck 10 and these side frame members 12 and 15 are adapted to telescope but since this truck 40 has an arcuate cradle means it is not feasible to provide extensibility laterally as in the previous apparatus. The telescoping side frame members 15 have elongated hand holds 17 which may conveniently serve as a tail skid or rest when the truck is in horizontal position; and bearing pads 16 upon the upper surfaces of the frame sides which move with these telescoping sections so as to provide the desired bearing surfaces in adjusted position. These bearing pads are likewise provided with a small radius at their inner edges, as in the previous instance, so as to securely accommodate rounded articles. Adjacent the upper end of the side frame members 12 is a transverse or cross frame member 42 of substantially V shape in elevation so as to more securely cradle cylindrical articles and the like, yet the horizontal arms 42a, in a plane with pads 16, of the V cross frame member provide adequate bearing for a flat backed article. Proximate the lower portion of the frame members 12 depending brackets 44 are welded normal to the inside faces thereof and extend therefrom a sufficient distance to provide peripheral clearance for truck wheels 45 which are rotatably journalled upon an axle 46 passed through the support brackets 44. Brace members 48 extend from the rear face 12a of side frame members 12 from adjacent their upper ends to the brackets 44 so as to strengthen and maintain the axle rigid and also provide a skid or runner in moving the truck on or off an automotive truck tailgate or loading dock, in order to prevent a sudden drop from the truck wheels to the truck proper. It will be noted the truck wheels 45 are substantially larger than the previously enumerated corresponding wheels 33 thus providing a better balanced load and easier rolling, the wheels being located whereby the center of gravity of the load passes through the wheels and the weight of the mass is taken by the wheels and axle with a minimum amount of load on the arms of the operator.

At the lower ends of each of the frame side members 12—12 a transverse shoe or toe plate member 50 is welded with the lower margin thereof extending therebelow and provides a load supporting portion and pad for the base and lower edge, respectively, of an article to be carried, and also, in this instance, having a central V section as shown similar to and in line with the mid-section of frame member 42. Depending from and welded normal to the opposite inner faces of the frame side members 12, at the rear face of the toe-plate 50 and parallel to axle brackets 44, are a second set of brackets 52 for pivotally supporting at their lower free ends shiftable brackets 53 which rotatably journal at one end auxiliary caster wheels 54, and a counter weighted cross bar 55 at the opposite upper end that maintains the wheels 54 in forward or retracted position as desired, for a purpose to be presently described. Handles 57 have a series of spaced elongated openings 58 in their body portion for adjustably positioning the same at a selected length to opposite sides of the rear face of the toe plate, by means of a T shaped bolt 59, and an opening therein, whereby the handle may be rotated to bring the elongated slot 58 and the T bolt in alignment for affecting a change in the extended handle length. When not in use the handles 57 may be rotated to a position behind the toe plate out of the way and the truck moved by means of the hand holds 17. Upon opposite ends of the toe plate 59 are a pair of spacer members 60 which elevate the toe plate so as to keep the handles 57 and the T bolt adjustments 59 from bearing upon the floor. The rear ends of the spacer members 60 are angled off or half-oval to form a brake portion 61 to prevent accidental displacement of the truck when in a substantially vertical self-standing position.

The use and operation of the truck 40 as concerns the small shiftable caster wheels 54 and handles 57 is as follows: When it is desired to pick up an article the truck is tilted upward by the hand holds 17 upon the main truck wheels 45 until the toe plate spacer 60 rests upon the ground, when the operator kicks the counter weighted shiftable cross bar 55 with his foot to bring the auxiliary caster wheels 54 into play so that now the main truck wheels 45 are raised from the ground and the truck fixed in an upright self-standing position whereby it may be tilted backward slightly off the brake pads 61 and rolled under the article to be carried. To return the truck to a balanced rolling position it may be tilted forward slightly, until the auxiliary caster wheels 54 are drawn up between the frame side members by the counter weighted cross bar 55, then backward tilting of the truck about the brake pads 61 as a fulcrum will bring the main truck wheels 45 into rolling contact with the ground. If it is now desired to wheel the truck in a horizontal position, instead of at an angle by use of the hand holds 17, it is only necessary to lower the truck down to the ground until the hand holds 17 are in position to act as a tail skid, then adjust the handles 57 to an angle normal to the toe plate 50 and at a convenient height for the operator and bear down upon the handles sufficient to raise the hand holds 17 off the ground and balance the load upon the truck wheels 45 and push it away. In this modification it is preferable to provide a bonderized cushioned rubber sheath only upon the adjustable bearing pads 16, V shaped cross frame member 42, and bearing portion and pad of the toe plate 50, that is to say, only those parts contacting the article to be carried and which are apt to mar the same. In this manner when the bonderized rubber coating becomes worn these parts can be replaced.

From the foregoing disclosures it will be apparent there has been described a novel portable and extensible hand truck embodying, among other things, the objects and advantages of the invention first enumerated. However, it is not intended to be limited to the specific embodiments herein disclosed, which are for purposes of illustration only and may be varied widely in actual practice through suggestions herefrom to persons skilled in the art to which this invention relates, but regard this invention as commensurate with the spirit and substance of the scope of the following claims.

What I claim is:

1. In a hand truck of the class described, in combination, a frame including a pair of side members having telescopic sections therein extensible longitudinally for reception of articles of various length, a transversely extending frame member having a depressed mid-section for cradling an article to be carried and connecting said side frame members adjacent their upper ends, transverse load supporting means connecting said frame side members adjacent their lower ends, a pair of wheels rotatably secured to the side frame members adjacent their lower ends, and spaced bearing pads secured to the upper end of each of said extensible telescopic frame sections including hand holds depending from the opposite face thereof.

2. In a hand truck of the class described, in combination, a frame including a pair of side members having telescopic sections therein extensible longitudinally for reception of articles of various lengths, a transversely extending frame member connecting said side frame members, load supporting means secured to the side frame members adjacent their lower ends, hand holds formed integral with a lateral portion of said load supporting means, bearing pads secured to each of said telescopic frame sections at their upper ends including a second pair of hand holds depending from the rear thereof, and a ground engaging portion upon the underside of the lateral section of said first mentioned load supporting means for fixing said truck in self-standing position with said first mentioned hand holds elevated from the ground in position for effecting initial tilting movement of the truck to enable conveniently swinging the remote hand holds upon the upper ends of the telescopic frame sections within reach.

3. In a hand truck of the class described, in combination, a frame including a pair of side members having telescopic sections therein extensible longitudinally for reception of articles of various length, a transversely extending frame member having a depressed mid-section for cradling an article to be carried and connecting said side frame members adjacent their upper ends, transverse load supporting means connecting said frame side members adjacent their lower ends, a pair of wheels rotatably secured to the side frame members adjacent their lower ends, spaced bearing pads secured to the upper end of each of said extensible telescopic frame sections including hand holds depending from the opposite face thereof, and a second set of shiftable wheels relatively smaller than said first wheels mounted by said side frame members forward thereof and adapted to be brought into ground engagement for rolling the truck when in a vertical position, or to balance the same in self-standing position.

4. In a hand truck of the class described, in combination, a frame including a pair of side members having telescopic sections therein extensible longitudinally for reception of articles of various length, a transversely extending frame member having a depressed mid-section for cradling an article to be carried and connecting said side frame members adjacent their upper ends, transverse load supporting means connecting said frame side members adjacent their lower ends, a pair of wheels rotatably secured to the side frame members adjacent their lower ends, spaced bearing pads secured to the upper end of each of said extensible telescopic frame sections including hand holds depending from the opposite face thereof, a second set of shiftable wheels relatively smaller than said first wheels mounted by said side frame members forward thereof and adapted to be brought into ground engagement for rolling the truck when in a vertical position, or to balance the same in self-standing position, and said shiftable wheels being connected by counterbalancing means arranged to remove these wheels automatically from ground engagement when the truck is tilted rearward until the first mentioned main truck wheels come in engagement with the ground.

5. In a hand truck of the class described, in combination, a frame including a pair of side members having telescopic sections therein extensible longitudinally for reception of articles of various length, a transversely extending frame member having a depressed mid-section for cradling an article to be carried and connecting said side frame members adjacent their upper ends, transverse load supporting means connecting said frame side members adjacent their lower ends, a pair of wheels rotatably secured to the side frame members adjacent their lower ends, spaced bearing pads secured to the upper end of each of said extensible telescopic frame sections including hand holds depending from the opposite face thereof, and a second set of hand holds having integral handle arms of adjustable length secured to and extending normally from the rear face of the transverse load supporting means whereby the truck may be rolled in a balanced horizontal position by an operator.

6. In a hand truck of the class described, in combination, a frame including a pair of side members having telescopic sections therein extensible longitudinally for reception of articles of various length, a transversely extending frame member having a depressed mid-section for cradling an article to be carried and connecting said side frame members adjacent their upper ends, transverse load supporting means connecting said frame side members adjacent their lower ends, a pair of wheels rotatably secured to the side frame members adjacent their lower ends, spaced bearing pads secured to the upper end of each of said extensible telescopic frame sections including hand holds depending from the opposite face thereof, a second set of hand holds having integral handle arms of adjustable length secured to and extending normally from the rear face of the transverse load supporting means, and spacer members upon opposite ends of the lower load supporting means to elevate the same from the ground and prevent the hand holds thereon from bearing upon the ground when the truck is in an upright or vertical self-standing position.

7. In a hand truck of the class described, in combination, a frame including a pair of side members having telescopic sections therein extensible longitudinally for reception of articles of various length, a transversely extending frame member having a depressed mid-section for cradling an article to be carried and connecting said side frame members adjacent their upper ends, transverse load supporting means connecting said frame side members adjacent their lower ends, a pair of wheels rotatably secured to the side frame members adjacent their lower ends, spaced bearing pads secured to the upper end of each of said extensible telescopic frame sections including hand holds depending from the opposite face thereof, a second set of hand holds having integral handle arms of adjustable length secured to and extending normally from the rear face of the transverse load supporting means, and spacer members upon opposite ends of the lower load supporting means to elevate the same from the ground and prevent the hand holds thereon from bearing upon the ground when the truck is in an upright or vertical self-standing position, said spacer members having an arcuate ground engaging portion acting as a brake to prevent accidental displacement of the truck.

8. A hand truck according to claim 1, in which said transverse cradle member, said lower load supporting means, and said upper bearing pads constitute replaceable rubber-sheathed members.

JOSEPH C. CHENETTE.